(12) United States Patent
Busri (10) Patent No.: US 8,833,554 B2
(45) Date of Patent: Sep. 16, 2014

(54) HOLDING AND SUPPORTING APPARATUS

(75) Inventor: Saharudin Busri, Kuala Lumpur (MY)

(73) Assignee: Mimos Berhad, Kuala Lumpur (MY)

( * ) Notice: Subject to any disclaimer, the term of this patent is extended or adjusted under 35 U.S.C. 154(b) by 72 days.

(21) Appl. No.: 13/120,823

(22) PCT Filed: Sep. 18, 2009

(86) PCT No.: PCT/MY2009/000152
§ 371 (c)(1),
(2), (4) Date: Jun. 12, 2012

(87) PCT Pub. No.: WO2010/036090
PCT Pub. Date: Apr. 1, 2010

(65) Prior Publication Data
US 2012/0261304 A1 Oct. 18, 2012

(30) Foreign Application Priority Data
Sep. 24, 2008 (MY) .................. PI 20083762

(51) Int. Cl.
*B65D 5/20* (2006.01)
*A45C 13/10* (2006.01)
*G06F 1/16* (2006.01)
*A45C 13/34* (2006.01)
*A45C 11/00* (2006.01)

(52) U.S. Cl.
CPC ........... *A45C 11/00* (2013.01); *A45C 2011/003* (2013.01); *A45C 13/1069* (2013.01); *A45C 2200/15* (2013.01); *A45C 2011/002* (2013.01); *G06F 1/1628* (2013.01); *A45C 13/34* (2013.01)
USPC .......................................... 206/320; 206/736

(58) Field of Classification Search
CPC ............ A45C 11/00; A45C 2011/002; A45C 2200/15; G06F 1/1628
USPC ................................ 206/736, 320, 45.2, 45.24
See application file for complete search history.

(56) References Cited

U.S. PATENT DOCUMENTS

| 4,044,980 A | * | 8/1977 | Cummins ...................... 248/456 |
| 5,105,338 A | * | 4/1992 | Held ........................ 361/679.09 |
| 5,327,669 A | * | 7/1994 | Lannan et al. .................... 43/26 |

(Continued)

FOREIGN PATENT DOCUMENTS

| JP | 2002185598 | 6/2002 |
| JP | 3130139 | 2/2007 |
| KR | 200386435 | 6/2005 |

*Primary Examiner* — Steven A. Reynolds
*Assistant Examiner* — King M Chu
(74) *Attorney, Agent, or Firm* — Bill C. Panagos; Linda D. Kennedy; Butzel Long (57) ABSTRACT

A holding and supporting apparatus (10) to hold an item (11) such as a portable digital device including a tablet personal computer (tablet PC) and Personal Digital Assistant (PDA), comprising a pair of panels with a malleable spine, and at least one magnet or other clasping means (28) encased within one of the panels and a stopper means (30) on external side of one panel. It is provided with a means (34, 36) to removeably secure the item (11) on inside panel. A strap (12) is secured at one end on the outside of the panel and is configured to fold along pre-designated fold lines, and further includes an encased magnet or other clasping means (28) at its free end. The panels are bendable over the spine and the strap (12) is foldable to support the panel in a predetermined position.

16 Claims, 9 Drawing Sheets

(56) References Cited

U.S. PATENT DOCUMENTS

| | | | |
|---|---|---|---|
| 6,105,766 A * | 8/2000 | Chuang | 206/320 |
| 6,301,098 B1 * | 10/2001 | Kim | 361/679.55 |
| 6,772,879 B1 * | 8/2004 | Domotor | 206/45.23 |
| 8,028,832 B2 * | 10/2011 | Lee | 206/320 |
| 8,047,365 B1 * | 11/2011 | Lin et al. | 206/320 |
| 8,282,065 B1 * | 10/2012 | Stone | 248/454 |
| 2003/0209903 A1 * | 11/2003 | Morris | 283/42 |
| 2004/0217027 A1 * | 11/2004 | Harris et al. | 206/320 |
| 2005/0029065 A1 * | 2/2005 | Christie | 190/102 |
| 2007/0119734 A1 * | 5/2007 | Pichahchi | 206/320 |
| 2007/0163897 A1 * | 7/2007 | Lee | 206/45.24 |
| 2007/0235492 A1 * | 10/2007 | Sirichai et al. | 224/930 |
| 2007/0295771 A1 * | 12/2007 | Herbig et al. | 224/191 |

\* cited by examiner

Figure 18 ated in the accompanying description and drawings, it being
HOLDING AND SUPPORTING APPARATUS

CROSS REFERENCE TO RELATED APPLICATIONS

The present application is a 35 U.S.C. §371 national stage filing of International Patent Application No. PCT/MY2009/000152, filed Sep. 18, 2009, and through which priority is claimed to Malaysian Patent Application No. PI20083762, filed Sep. 24, 2008, the disclosures of which are incorporated herein by reference in their entireties.

FIELD OF INVENTION

The present invention relates to a holding and supporting apparatus.

BACKGROUND ART

Holders for a portable computer, especially a laptop or a notebook are known in the market. The holders generally encase the laptop or personal computer (PC). US patent application which has been published as US 2008/0017541 A1 discloses a portable computer case. In this invention, the laptop computer need not be removed from the case, enabling use of the laptop computer keyboard, display and ports located on a back edge of the laptop computer while the laptop computer remains in the case. In this invention, a conventional laptop computer is used. Casings of rigid material are respectively attached to the display portion and the keyboard portion.

US patent application which has been published as US 2007/0232109 A1 discloses a computer case for transporting a laptop computer. The case includes two mating sections and an inner cushioned liner in each section for cushioning the laptop therein in a protective manner. This case is used to transport a laptop computer and is not used when the laptop is used as it is merely a carrier box.

PCT patent application which has been published as WO 97/19006 discloses a cover for a laptop or notebook computer. The cover is a thin flexible material adapted to fit closely over the computer like a glove. The cover has cut-outs for the keyboard, screen, controls, ports, etc. of the computer so that the cover does not interfere with convenient use of the computer.

PCT patent application which has been published as WO 97/34215 discloses a holder for a portable computer, especially a laptop or a notebook. The holder holds a laptop, or notebook and/or peripherals, like printers and telecommunications instruments. It has a moulding having at least one compartment with elastic bearing surfaces for a housing of a computer or peripheral with a bottom and side walls.

All the prior art holder apparatuses for a laptop computer or notebook allow the positioning of the keyboard and display screen in a conventional manner, that is the display screen is rotable about the keyboard, corresponding simultaneously with the rotational movement of one half of the holder about the other half of the holder. Although the cases or covers provide some form of physical protection to the laptop computer or the notebooks, they do not facilitate multi-purpose display positions or allow users to exploit the flexibility of use of the laptop computer or the notebook.

There is a need for a holding apparatus which gives physical protection for a mobile tablet PC, PDA, mobile telephone or other computing devices with a display screen and simultaneously allows various, positions of use of the said computing device. There is also a need for a means to facilitate the viewing or operation of the computing device from various angles, whilst simultaneously acting as protective cover for the computing device.

In this description, the term "computing device" shall include tablet personal computer, mobile telephone, FDA or any other computer enabled devices with a screen.

SUMMARY OF THE INVENTION

Accordingly, there is provided a holding and supporting apparatus to hold an item comprising a pair of panels comprising an item holding panel and an opposite panel, both of which are connected by a malleable spine; a stopper means on an external side of the item holding panel; a securing means to removeably secure the item on an internal side of the item holding panel; a strapping means secured at one end on the external side of the item holding panel, said strapping means includes fold lines and a means to removeably attach free end of the strapping means to an external side of the opposite panel and a clasping means to connect the strapping means to the external side of the item securing panel when the apparatus is in a closed position; wherein the item securing panel and the opposite panel are bendable, backwards over the malleable spine and the strapping means is foldable to support the item securing panel in a predetermined position.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF DRAWINGS

The drawings constitute part of this specification and include an exemplary or preferred embodiment of the invention, which may be embodied in various forms. It should be understood, however, the disclosed preferred embodiments are merely exemplary of the invention. Therefore, the figures (not to scale) disclosed herein are not to be interpreted as limiting, but merely as the basis for the claims and for teaching one skilled in the art of the invention.

DETAILED DESCRIPTION OF THE PREFERRED EMBODIMENTS

The present invention relates to a holding apparatus for portable digital devices such as tablet PC and PDA. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The following detailed description of the preferred embodiments will now be described in accordance with the attached drawings, either individually or in combination.

Figure 1:
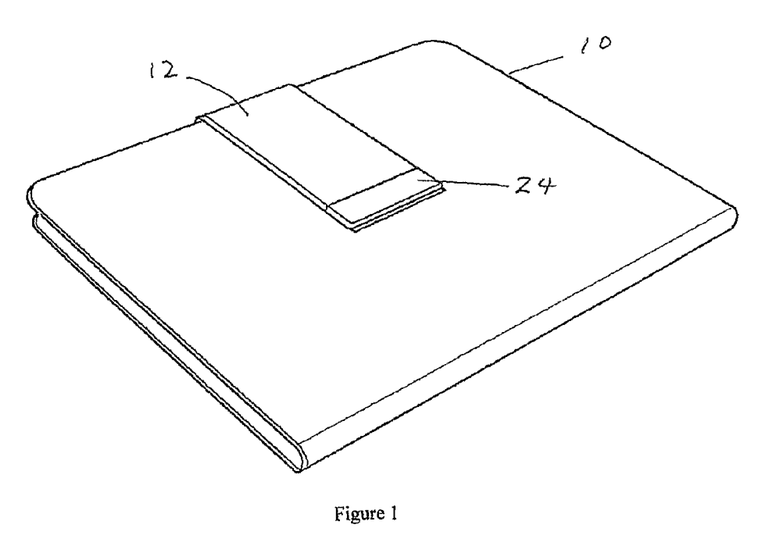
FIG. 1 is a perspective view of the cover in a dosed position.
Figure 2:
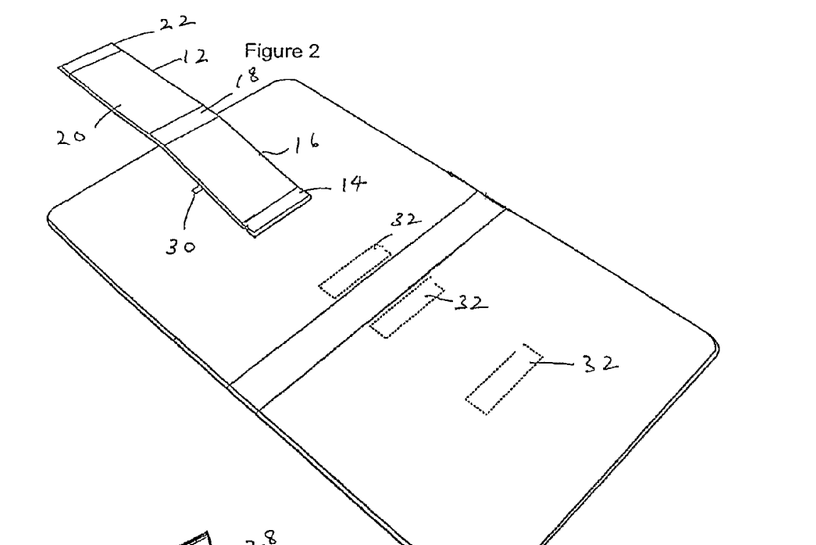
FIG. 2 is a perspective view of outside panel of the cover shown in FIG. 1 but in an open position.

In the first embodiment (see FIG. 1), there is shown a perspective view of the holder apparatus (10) enclosing a tablet PC in a closed or shut position. The holder apparatus consists of a water resistant malleable sheet firmly enveloping two fairly rigid panels similar to a hard book cover configuration. The malleable sheet is preferably leather, faux leather, plastics, paper, or other suitable sheets of material. On external side of the holder apparatus is a strap (12). The strap (12) consists of four distinct regions (see FIG. 2). The first region (14) is a small strip of the strap that is immovably secured to the holder apparatus. It can be sewed onto the holder apparatus or glued onto the holder apparatus. The second region (16) is a longer strip, foldable over the first region (14). The third region (18) is another short strip. The fourth region (20) is a longer strip. The third strip (18) is foldable over the third and fourth regions (16, 20) respectively. All the four regions of the strip include malleable sheets as in the holder apparatus, enclosing rigid material, such as cardboard or paper to provide substantial rigidity to the strip. Preferably all the four regions are of a single integral material.

The free end (22) of the strap (12) includes a buckle (24) with a lip (27) extending across the length of the buckle. The buckle (24) can be of metal or of other rigid material. Encased within the free end of the fourth region is a clasping means such as magnet (28) (see FIG. 3). A stopper (30) is provided on the outer side of the holder apparatus, preferably substantially at the lengthwise mid-portion of the holder apparatus (10).

On the opposite panel of the item securing panel there is provided a clasping means to lock or accept the clasping means on the end of the strap (28). As an example, at least two magnets are positioned inlay in the opposite panel of the item securing panel in such a position so as to enable the magnets (28) in the strip to be in magnetic contact with one of the two said magnets at any one time.

The item can be removeably attached to an inner side of one of the panel. At each of two corners at the base of the panel securing item are provided a bracket (34). The brackets (34) are dimensioned and configured to receive and hold the item in a snug fitting manner (see FIGS. 4 and 5). At each of the two upper corners of the casing are provided a pair of strips (36) with cooperative acting hook and loop means (38) at the terminal end of each strip. The brackets (34) and the pair of strips (36) are preferably of malleable material, such as leather, faux leather, plastics, rubber and the like. Alternatively the strip (36) can be provided at all four corners, similarly the position of the brackets (34) and the two pair of strips (36) can be interchanged.

Figure 17:
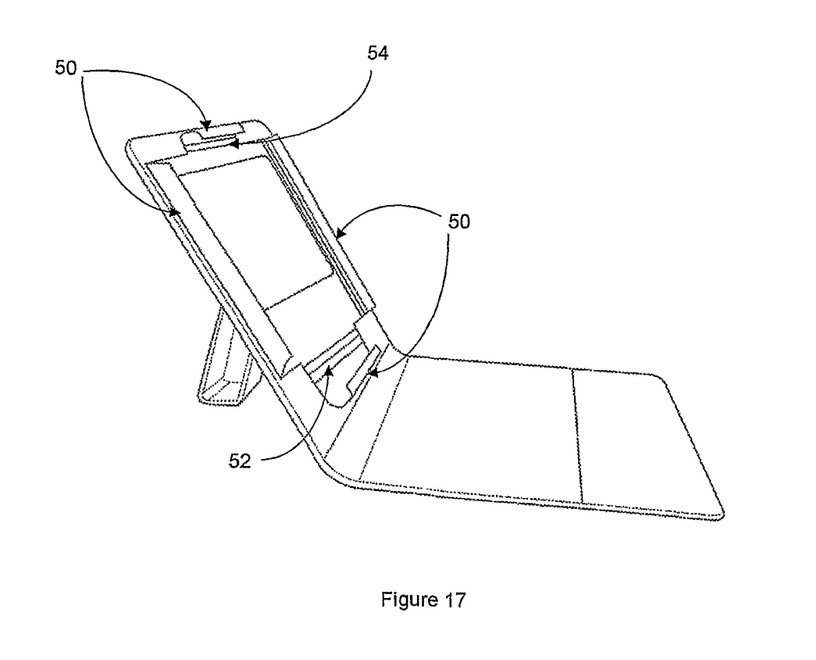
FIG. 17 is a perspective view of the apparatus having elongated brackets at four edges at the item securing panel.

FIG. 17 illustrates the holding apparatus with other means of removeably securing the item onto the inner side of the item securing panel. There are provided elongated brackets (50) on the edges of the panel. These brackets (50) can be of any sturdy material such as plastic to enable: the item to be snapped into place. Furthermore, the brackets can be slideable both horizontally and vertically to accommodate items of various size (52). The slide-able brackets come with a fastening means (54) to enhance the grip on the item thus holding it more secure.

Figure 18:
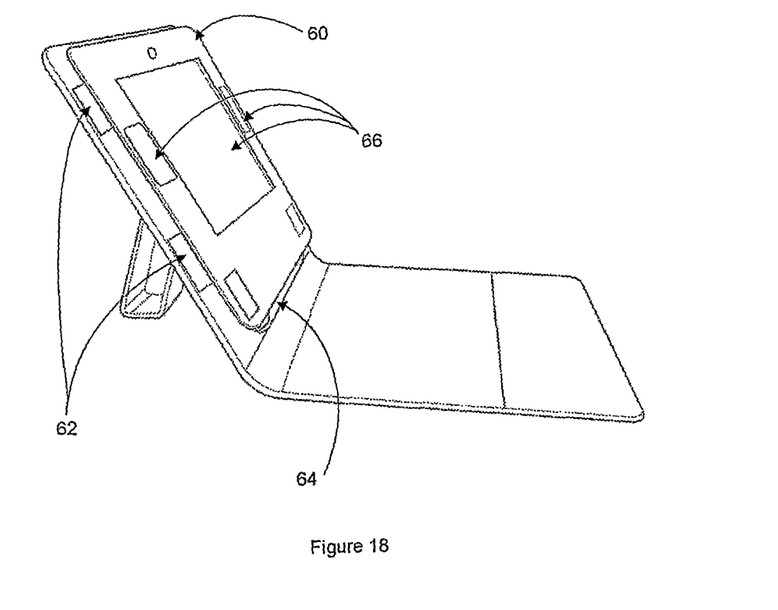
FIG. 18 is a perspective view of the apparatus having planar sheet at the item securing panel.

Alternatively as shown in FIG. 18, there are provided a planar sheet (60) attachable to the panel securing the item by plurality of elastic strips (62) situated at both the vertical edges. There is also a bracket (64) connecting the planar sheet to the panel securing item near the spine. This bracket (64) provides additional support for the item. The planar sheet (60) serves as a pocket portion to slot in the item. The planar sheet (60) includes a plurality of cutouts (66) for areas such as display region and sections for human interaction with the item. The planar sheet (60) is preferably leather, faux leather, plastics, paper or other suitable sheet material. The plurality of strips (62) and the bracket (64) are preferably of malleable material, such as leather, faux leather, plastics, rubber and the like.

Figure 3:
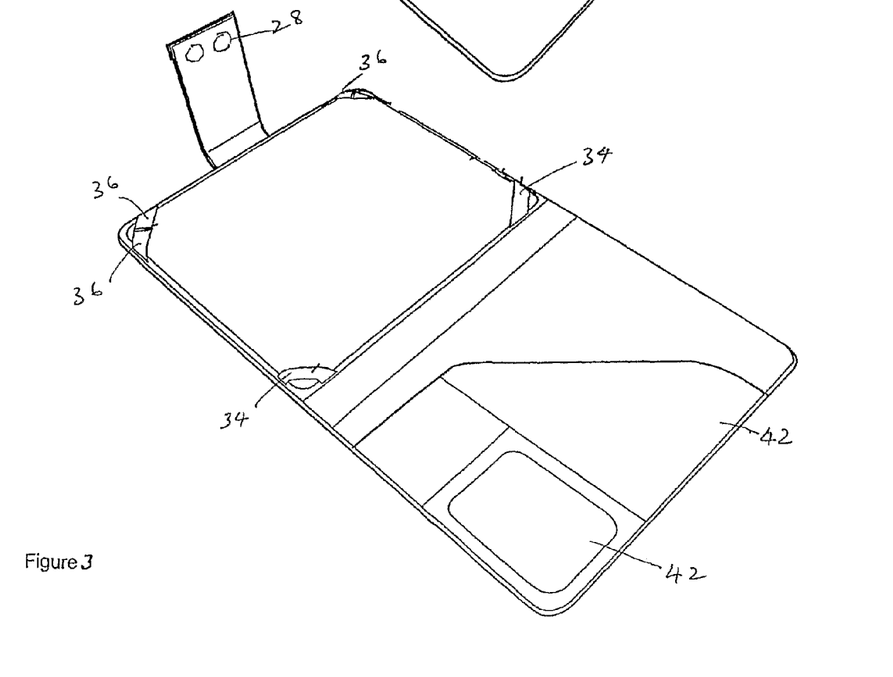
FIG. 3 is a perspective view of inside panel of the cover without a keyboard shown in FIG. 1 in an open position.

The inner side of the holder apparatus opposite where the item is mounted can include a plurality of pockets (42) to receive and hold paper, cards and the like (see FIG. 3). Further other known means of removeably securing the tablet PC onto the inner side of the holder apparatus can be conveniently adopted.

Figure 12:
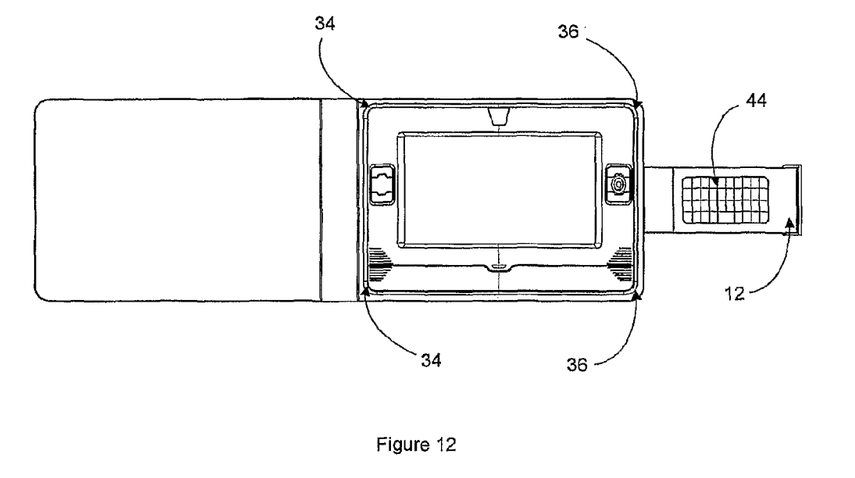
FIG. 12 is a top view of an embodiment of the invention in an open position.
Figure 13:
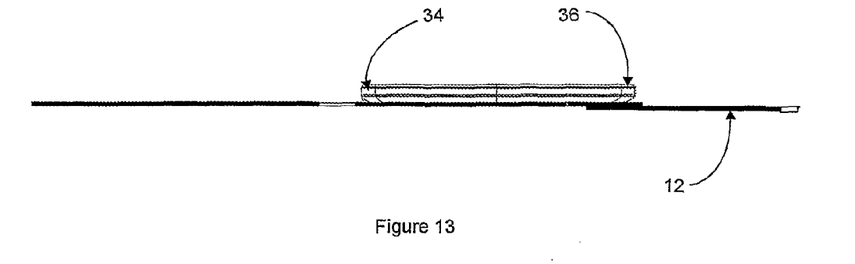
FIG. 13 is a side view of the embodiment shown in FIG. 12 but in a closed position.

In the second embodiment (see FIG. 8), where the item is a portable digital device such as tablet PC, there is also provided an input device such as a keyboard (40) on the inner side of the panel opposite the item securing panel. Alternatively another type of input device such as a keypad (44) can also be integrated on the inner side of the strap (12) (see FIG. 12). In this configuration, the said strap is no longer serving as a stand to the holding apparatus. Each of the input devices (40, 44) is electronically connected to the tablet PC by means of wireless connection such as Bluetooth® connection or by wired connection such as USB connection.

Ventilation holes are provided on the holder apparatus, and are positioned in a manner to be adjacent to heat expulsion means of the computing means. In the embodiments shown in FIGS. 1 and 8, ventilation vents are positioned between the stopper (30) and the first region (14) of the strap.

Figure 4:
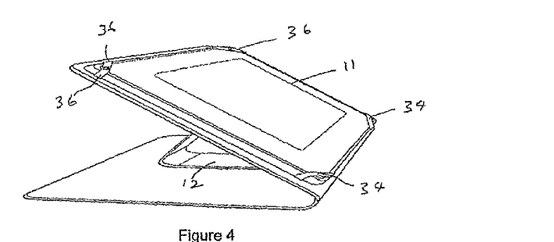
FIG. 4 is a perspective view of the cover with a mobile tablet PC mounted thereon positioned in a display mode.
Figure 5:
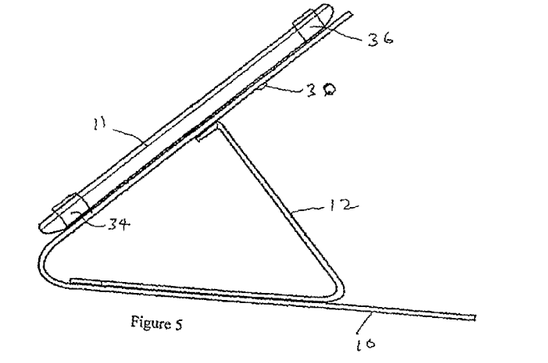
FIG. 5 is a cross sectional view of the assembly shown in FIG. 4.
Figure 6:
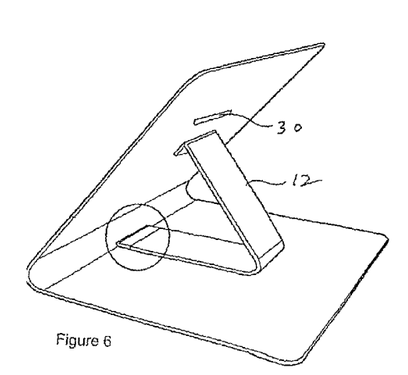
FIG. 6 is a perspective back view of the assembly shown in FIG. 4.
Figure 7:
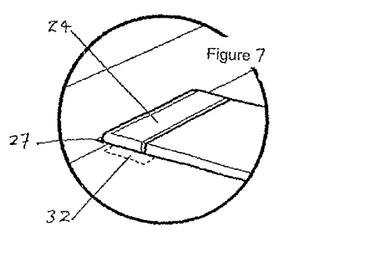
FIG. 7 is a close up view manner of attachment of metal buckle to a built-in magnet.

FIGS. 4 and 5 show arrangement of the holder apparatus (with a tablet PC mounted thereon) in a display angle. The holder apparatus (10) is bend away by bringing the exposed sides towards each other. The strap (12) is then bend in a manner such that the free end (where the buckle (27) is attached) is brought toward the "spine" region of the holder apparatus. It will be appreciated that the buckle region of the strap includes a clasping means such as a pair of encased magnets (28) which are magnetically attached to the magnets (32) encased in the holder apparatus (see FIGS. 6 and 7).

Figures 8, 9:
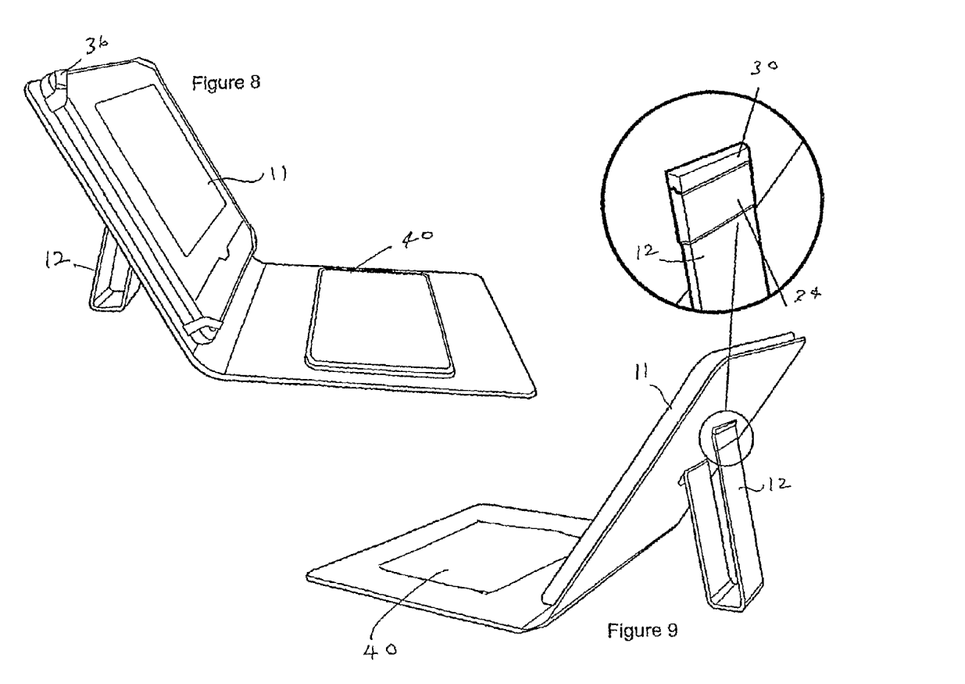
FIG. 8 is a perspective front view of a tablet PC mounted onto a cover which includes a keyboard.
FIG. 9 is a perspective back view of the tablet PC shown in FIG. 8.

In another position, one side of the holder apparatus is placed flat on a flat surface, while the holder apparatus bearing the tablet PC is supported by the strap in a bend position (see FIGS. 8 and 9). In this position, the lip of the buckle (27) is snuggly positioned adjacent to the stopper (30). This gives a sturdy configuration.

Figure 10:
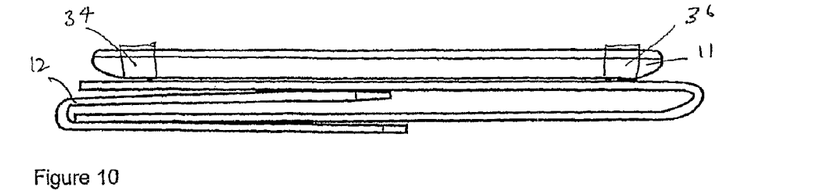
FIG. 10 is side view of the cover folded in manner to expose the mobile PC in an upward facing direction.
Figure 11:
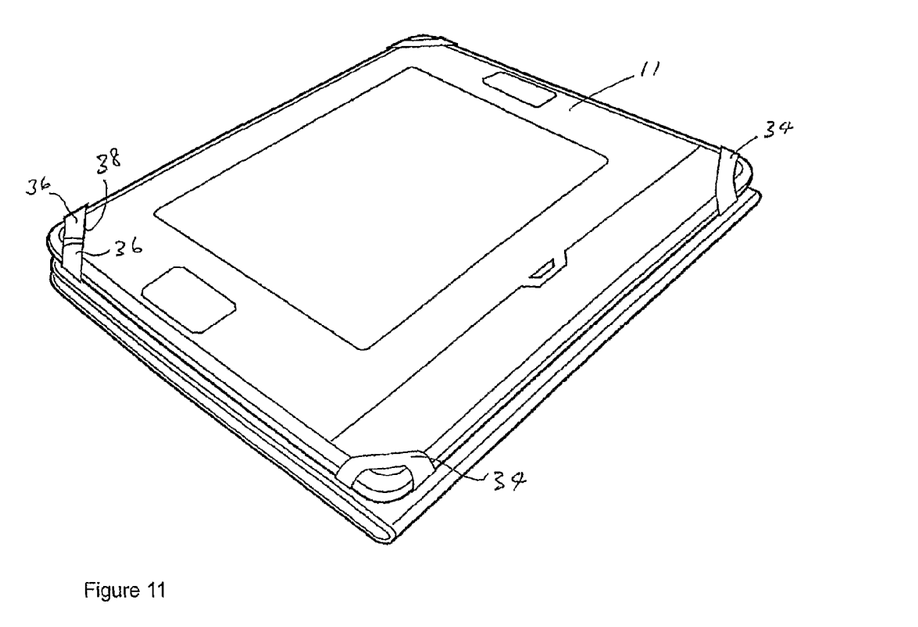
FIG. 11 is a perspective of the configuration shown in FIG. 10.

Yet in another position, the holder apparatus (10) is bend backwards and the strap (12) is placed across the holder apparatus (10) (see FIGS. 9 and 10). The holder apparatus though fairly rigid on both panels is malleable or bendable at the spine portion.

Figure 14:
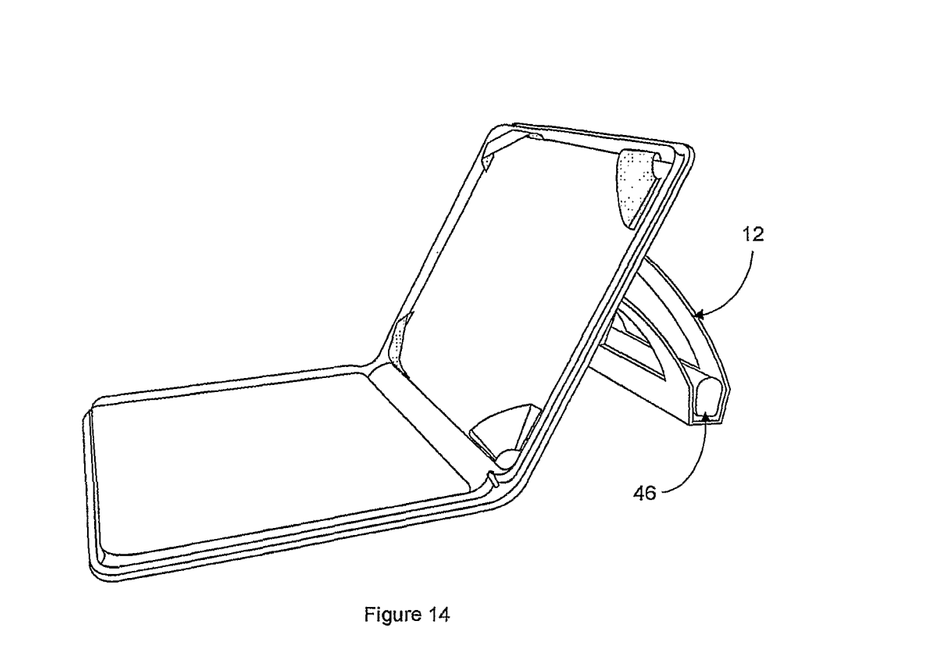
FIG. 14 is a side view of another embodiment of the invention in a stand-up position.
Figure 15:
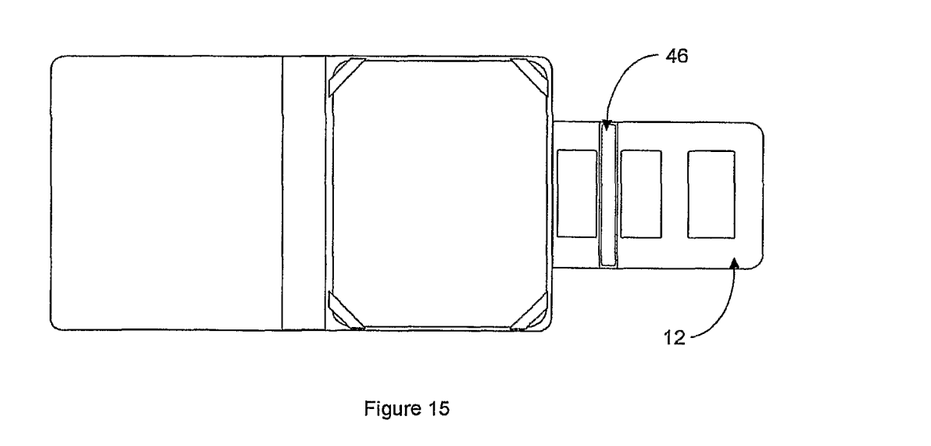
FIG. 15 is a top view of the embodiment shown in FIG. 14 in an open position.

In a third embodiment, shown in FIG. 14, the strap (12) is extended so as to form a carrier handle. The strap includes a rigid elongated member or rod or bar (44) over which one portion of the strap is foldable. As in the first embodiment, the strap is secured to the outer casing at one end. In a standing or display position, the strap is folded over the rigid elongated member (44) and free end of the strap is butted against the stopper means (30) (see FIG. 14).

Figure 16:
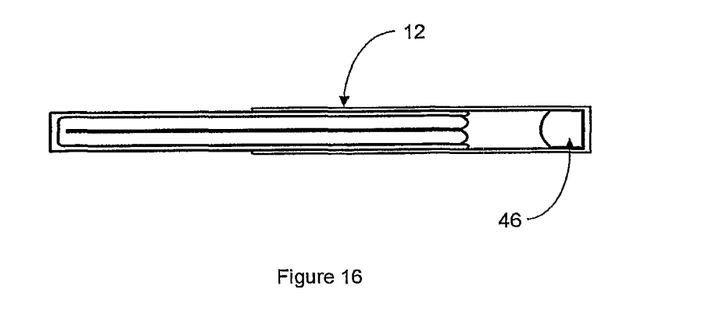
FIG. 16 is a side view of the embodiment shown in FIG. 14 in a closed position.

In a closed position, the strap (12) is folded over the rigid elongated member (44) across external side of one side of the holder apparatus (see FIG. 16). The free end region of the strap includes magnets positioned within the strap, and magnets positioned within casing, so that in a closed position of the holder apparatus, the strap is firmly positioned over the casing, and acts a carrier handle of the holder apparatus. The features of the inner side of the holder apparatus are similar to the features of the holder apparatus described in the first embodiment (FIG. 1) One side of the holder apparatus has bracket (34), bracket strips (36) with hoop and loop means (38) to hold the computing device in a fixed position. The other side of the holder apparatus preferably includes pockets to hold stationery or like items.

Other features can be added or substituted to make the holder apparatus more versatile or be adapted to meet other demands. For example, the strap (12) instead of being non-moveably secured at the first region (14) can be bolted at that region, thus enabling the strap to be rotatable about a bolt, where the strap (12) is thus rotatable about an axis and, the holder apparatus can be aligned into other positions.

In the embodiments described and illustrated, the strap (12) uses magnets to secure the strap over the casing to securely enclose the computing device. It will be appreciated that other securing means can be used. For example, the magnets may be substituted with hoop and loop closure means (Velcro®), or by button means. The corners of the holder apparatus can be enhanced by the provision of metallic corner holders, as seen in diaries.

The spine portion of the holder apparatus can be replaced by wire rings, thus enabling holder apparatus panels to be rotatable about the rings, like a book. A zip can be secured to the edge of the holder apparatus, such that in a closed position of the holder apparatus (10), the zip can be drawn to prevent exposure of the tablet PC to the outside.

The invention claimed is:

1. A holding and supporting apparatus to hold an item, comprising a pair of panels comprising:
   an item holding panel and an opposite panel, both of which are connected by a malleable spine;
   a stopper means on an external side of the item holding panel;
   a securing means to removeably secure the item on an internal side of the item holding panel;
   a strap secured at one end on the external side of the item holding panel, said strap including fold lines and removeably attachable at a free end to an external side of the opposite panel;
   said strap further including a first region immovably secured to the holder apparatus;
   a second region foldable over said first region;
   a third region and a fourth region;
   said third region foldable over said third and fourth regions;
   each said region including malleable sheets enclosing a rigid material; and
   a clasp to connect the strap to the external side of the item securing panel when the apparatus is in a closed position;
   wherein the item securing panel and the opposite panel are bendable, backwards over the malleable spine and the strap is foldable to support the item securing panel in a predetermined position.

2. The apparatus as claimed in claim 1, wherein the item is selected from portable digital devices, tablet personal computers (tablet PC) and Personal Digital Assistant (PDA).

3. The apparatus as claimed in claim 1, wherein the securing means includes at least one corner bracket at the item securing panel, and at least one pair of straps diagonally opposite the corner bracket, said straps include reciprocating hook and loop means wherein the item is securable in position by the bracket and the pair of straps.

4. The apparatus as claimed in claim 1, wherein the securing means includes at least one elongated bracket on horizontal and vertical edges of the item securing panel, and at least one elongated bracket on opposite edges.

5. The apparatus as claimed in claim 4, wherein each said bracket is slide-able and each has a fastener.

6. The apparatus as claimed in claim 4, wherein said brackets have cut-outs or holes.

7. The apparatus as claimed in claim 1, wherein the securing means includes a planar sheet attachable with plurality of strips and at least a bracket to the inside of the item securing panel.

8. The apparatus as claimed in claim 7, wherein said planar sheet includes at least one cutout window.

9. The apparatus as claimed in claim 2, wherein the apparatus is provided with an input device, which may include a keyboard which is placed on the inside of the opposite panel in which the input device is electronically connected to the digital device via a wired or a wireless means.

10. The apparatus as claimed in claim 2, wherein the apparatus is provided with an input device such as a keypad which is placed on the inside of the strapping means.

11. The apparatus as claimed in claim 10, wherein the strap is not supporting the panel securing the PC in a predetermined position.

12. The apparatus as claimed in claim 2, wherein an array of holes are provided on the panel securing the item to act as ventilation vents.

13. The apparatus as claimed in claim 1, wherein the inside of the panel opposite the panel securing the item includes at least one pocket to hold stationary.

14. The apparatus as claimed in claim 1, wherein the strapping means include a rigid buckle at its free end to engage upon the stopper means on the external side of the item securing panel.

15. The apparatus as claimed in claim 1, wherein a rod or bar is positioned along the strapping means to enable lifting of the holder apparatus by means of the strap.

16. The apparatus as claimed in claim 5, wherein said brackets have cut-outs or holes.

* * * * *